United States Patent [19]

Hosoe

[11] Patent Number: 4,477,168
[45] Date of Patent: Oct. 16, 1984

[54] RANGE FINDER

[75] Inventor: Kazuya Hosoe, Tokyo, Japan

[73] Assignee: Canon Kabushiki Kaisha, Tokyo, Japan

[21] Appl. No.: 410,705

[22] Filed: Aug. 23, 1982

[30] Foreign Application Priority Data

Aug. 27, 1981 [JP] Japan .................. 56-134754

[51] Int. Cl.³ .................. G03B 13/20; G01C 3/08
[52] U.S. Cl. .................. 354/403; 356/1
[58] Field of Search .................. 354/402–409, 354/25 R, 25 A, 25 P, 31 F; 250/201, 204, 214 B; 356/1, 4

[56] References Cited

U.S. PATENT DOCUMENTS 3,820,129 6/1974 Hosoe et al. .................. 354/25 A
4,274,735 6/1981 Tamura et al. .................. 354/25 A

FOREIGN PATENT DOCUMENTS 1965064 7/1971 Fed. Rep. of Germany ... 354/25 A

Primary Examiner—William B. Perkey
Attorney, Agent, or Firm—Toren, McGeady and Stanger

[57] ABSTRACT

In the disclosed optical device, independent light sensors located at separate positions which receive light projected by a projector and reflected by an object whose distance is to be measured, produce outputs corresponding to their respective positions. A distance indicator indicates the distance to the object on the basis of the ratio of outputs of the sensors.

12 Claims, 3 Drawing Figures

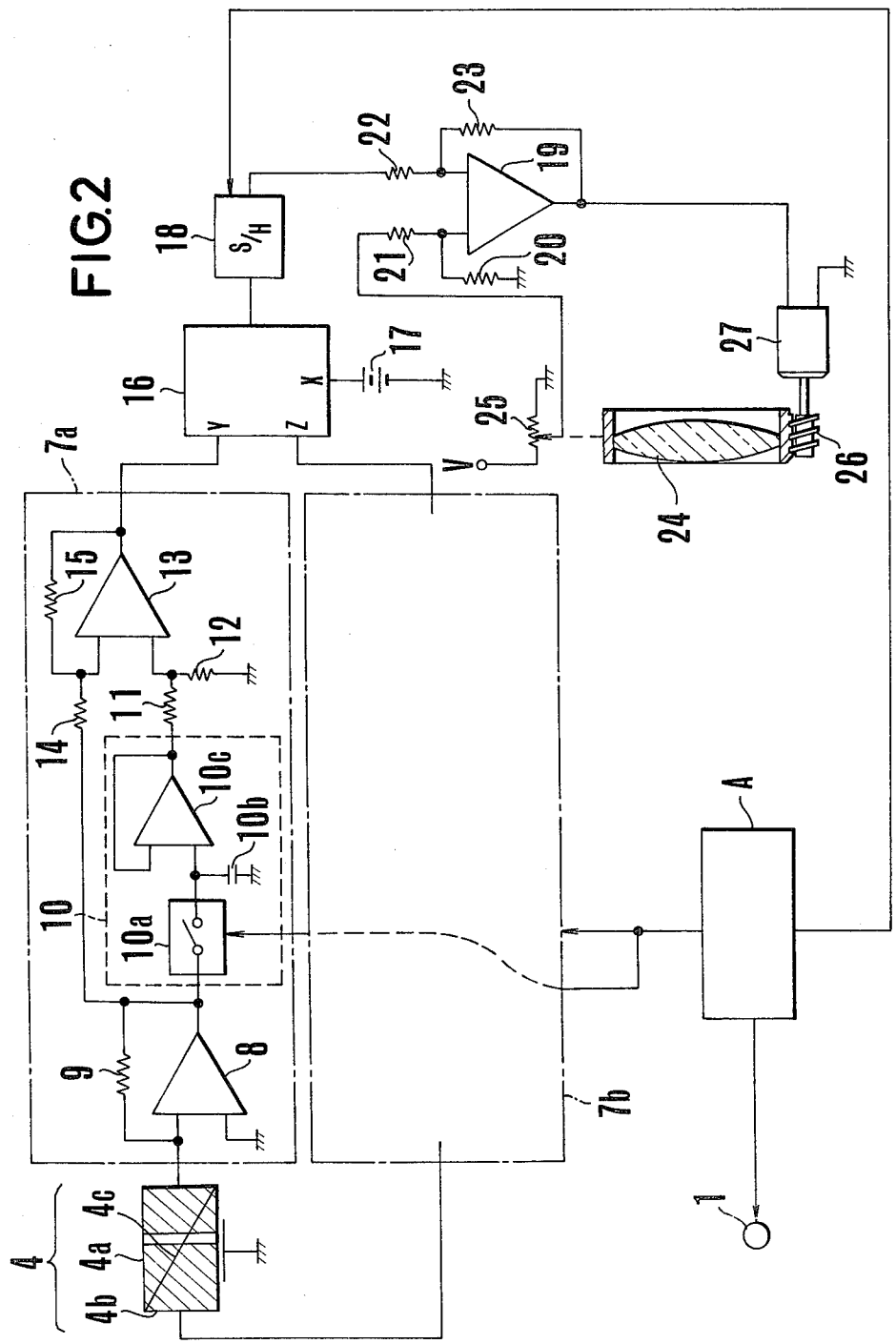

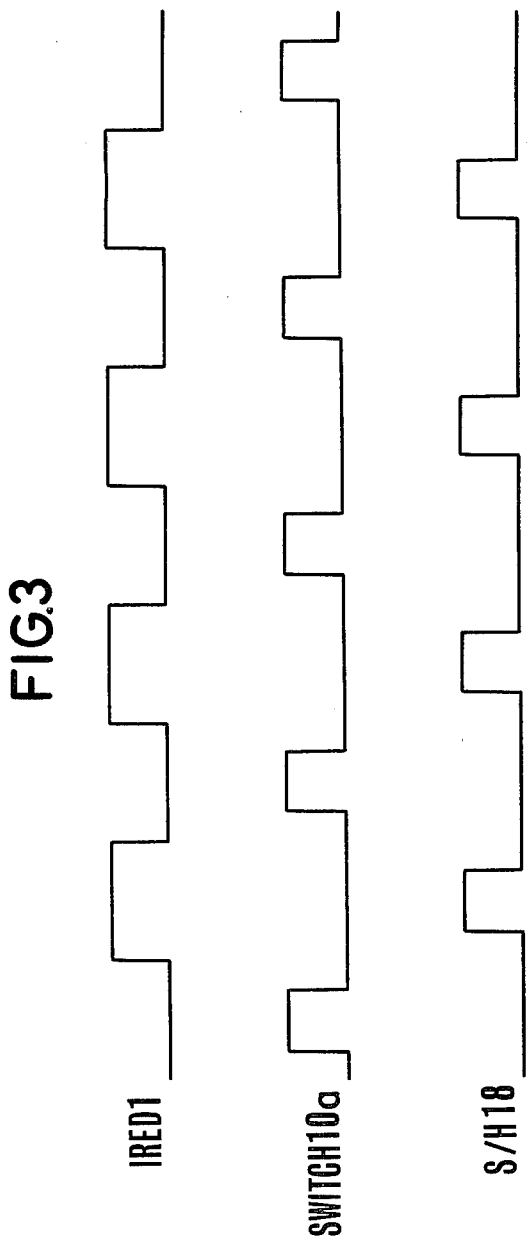

RANGE FINDER

BACKGROUND OF THE INVENTION

1. Field of the Invention

The present invention relates to optical devices, specifically range finders, and particularly to range finders in which a projector directs light onto an object and a number of independent light receiving elements are able to produce outputs corresponding to imaging positions on the light receiving elements so as to measure the distance to the object.

2. Description of the Prior Art

U.S. Pat. No. 3,820,129 discloses the basic arrangement of such type of range finder. In this patent, a bridge circuit detects the difference in outputs of two light receiving elements and this difference is used as a distance signal. However, this arrangement suffers from the fact that the reflection factor of the object whose distance is being measured can vary the difference in outputs of the elements. This prevents an accurate range finding indication. Also, this patent discloses projecting light being received through a filter for eliminating the influence of external light. However, such a method cannot completely eliminate external light. Hence, the outputs of the light receiving elements will be influenced by the ambient light, and could thus result in erroneous distance outputs.

SUMMARY OF THE INVENTION

An object of the present invention is to improve prior distance measuring devices and is characterized by a circuit arrangement which responds to the differences in outputs of the two light receiving elements when the light projector projects light and when the the light projector does not project lights, and then obtains the ratio of the differences in the outputs of the light receiving elements so as to detect the distance to an object. Such an arrangement can prevent the undesirable influence of external light and errors derived from the reflection factor. Hence, such a device corrects the range finding operation under a wide range of circumstances.

BRIEF DESCRIPTION OF THE DRAWINGS

FIG. 2 is a circuit diagram illustrating a circuit diagram for the range finder of FIG. 1.

FIG. 3 is a timing chart for the circuit of FIG. 2.

DESCRIPTION OF THE PREFERRED EMBODIMENT

Figure 1:
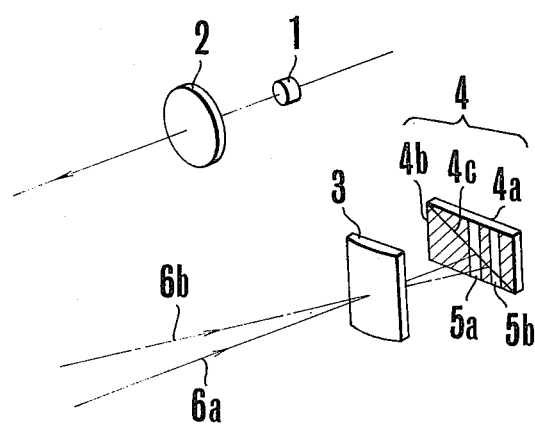
FIG. 1 is a schematic diagram illustrating an arrangement of a range finder according to the present invention.

In the drawings, FIG. 1 is a schematic diagram showing an arrangement of an automatic focusing device embodying features features of the present invention. Here, a projection light source 1, such as an LED, LD (laser diode), or Xe lamp, etc., projects light onto the object through a light projecting lens 2 so as to form an image of the light source on the object. Luminous flux reaching the object is partially reflected and reimaged by a light receiving lens 3 onto a light receiving device 4 behind the lens 3 which is separated an appropriate distance from the light projecting lens 2. The position of the image being re-imaged will occur at the position 5a when the object reflecting the light is far from the device of FIG. 1, but will be re-imaged at position 5b when the object is close to the apparatus of FIG. 1. The distance between the light projecting lens 2 and the light receiving lens 3 forms a base line length. Hence, when the object is far away, the reflected luminous flux passes along an optical path 6a and when the object is closer, the luminous flux passes along an optical path 6b.

The light receiving device 4 is divided into two light receiving elements 4a and 4b independent of each other and separated by a boundary 4c as shown in the drawing. The ratio of outputs of the elements 4a and 4b varies according to the positions of the images 5a or 5b on the light receiving elements. The positions depend on the distances to the object and this allows a range finding operation to be performed. While the boundary in this example is a straight line inclined relative to the base line, the shape of the boundary line is not limited to that shown in this example as long as the ratio of outputs of the light receiving elements changes by a specific relationship according to the positions of the images. In order to have the device in this example function properly, images on the light receiving elements should have shapes such as shown in the drawing. This is realized, for example, by using a cylindrical lens as the light receiving lens 3. That is, a cylindrical lens makes an image of a projection-light-souce-illuminated object linear on the light receiving element. Thus, wherever images are formed on the light receiving elements, depending on distances to an object, the ratio of outputs of two light receiving elements will exactly correspond to the distance.

FIG. 2 is a diagram illustrating a circuit arrangement of the automatic focusing device shown in FIG. 1, and timing charts therefor are shown in FIGS. 3A to 3C. In FIG. 2, a control A actuates each part of the circuit by applying a high level signal thereto. The projection light source 1 is made to flicker in synchronism with a signal from the control A. Two light receiving elements 4a and 4b are independent photo-electric conversion elements, and one pole of each is grounded and the other pole is introduced into an amplifier. Identical circuits to process outputs of the elements 4a and 4b are shown by frames 7a and are composed, for simplicity, of one-dot chain lines. An explanation is given only for the signal processing circuit in frame 7a.

Here, an amplifier 8 receives the output of the light receiving element 4a at one input terminal, has its other input terminal grounded, and forms an amplifier circuit for the output of the light receiving element 4a together with a resistor 9. A known sample holding circuit composed of a switch 10a, a capacitor 10b, and a buffer amplifier 10c is connected to an output terminal of the amplifier 8. The switch 10a is closed as it receives a high level signal from the control A, and when a signal from the amplifier 8 is introduced, the latter signal is memorized in the capacitor 10b. This signal is retained and formed as an output even when the switch 10a receives a low level signal from the control part A and is opened.

An output terminal of the sample holding circuit 10 is connected to one of the input terminals of an amplifier 13 by means of resistors 11 and 12. The output of the amplifier 8 which is introduced into the sample holding circuit 10 at its one end is also supplied to the amplifier 13 through a resistance 14. A feedback resistance 15 is inserted between an output terminal and an input terminal of the amplifier 13, and resistances 14, 11, 12 and 15 a differential amplifier circuit with amplifier 13.

In operation, when the projection light source 1 receives a low signal from the control A and is in a non-light-projecting condition, the switch 10a has a high level signal impressed thereon and is closed to cause capacitor 10b to accumulate output signals from the light receiving element 4a through the amplifier 8. When the projection light source 1 is set in the light projection condition by a low signal from the control A, the low signal opens the switch 10a. The output signal from the light receiving element 4a, which is produced when light is being projected by the source 1, will not be introduced into the sample holding circuit 10. While a signal during the non-light-projecting condition is always introduced into one end of the amplifier 13 from the sample holding circuit 10, a signal corresponding to the light projecting condition is always introduced into the other end of the amplifier 13 through the amplifier 8 and the resistance 14. Therefore, in the light projecting condition, a difference in outputs of elements 4a between the time light is being projected on the object and the time light is not being projected on the object can be obtained at an output terminal of the amplifier 13. That is, only an output of the image caused by the projection light source on the light receiving element 4a will be obtained. A circuit shown as 7b performs the same function as that of the circuit 7a, and as a result, the outputs of the circuits 7a and 7b will be the outputs of the images caused by the projection light source on each of the light receiving elements 4a and 4b. A three-inputs multiplier 16 with inputs of X, Y, Z and is a known type of circuit can obtain $$\frac{X \cdot Y}{Z}$$

as its output. Ordinarily this type of multiplier is actuated by current, but recently voltage actuation type multipliers (for example, quadrant multiplier 8013, made by Intersil, Inc.) have become available commercially.

Since outpts of the circuits 7a, 7b are imparted to the terminal Y and terminal Z respectively as voltages, a voltage actuation type of multiplier is suitable. If a predetermined value of voltage $V_o$ is imparted to a terminal X by a suitable power source 17, a voltage corresponding to the output ratio of the light receiving elements 4a and 4b will be produced at the output terminal of the multiplier 16. That is, an output corresponding to the object distance will be produced.

A known sample holding circuit 18 receives a signal from the multiplier 16 as an input thereto. The circuit 18 is to receive a high level signal from the control part A during the light projecting condition to have the signal from the multiplier 16 introduced thereinto, and at the same time is to hold the signal during the non-light-projecting condition. Hence, the circuit 18 always produces the signal of the multiplier 16 in the light projecting condition. That is, the signal from the multiplier 16 during the light projecting condition is the ratio of the difference in signals in the light projecting and non-light-projecting conditions of the light receiving elements 4, that is a distance signal. However, a ratio of signals both of which are in the non-light-projecting condition will be produced under the non-light-projecting condition. Therefore, the latter ratio in the non-light-projecting condition is to be eliminated for stablizing control of a photo-taking or photographic objective lens. An amplifier 19 forms a differential amplifier circuit with resistors 20, 21, 22 and 23. The output of a potentiometer 25 associated with movement of a photo-taking or photographic objective lens 24 and the aforementioned distance signal are introduced into the circuit 19. A predetermined value of voltage V is imparted to the potentiometer 25 and the voltage at the sliding contact of resistance 25 corresponds to the position of the photo-taking lens. Therefore, the output of the differential amplifier circuit 19 corresponds to the deviation of the output representing the object distance and the regulated position of the photo-taking lens 24. A motor 27 is arranged to be able to control the photo-taking lens 24 through a gear train 26. When the output of the differential amplifier circuit 19 is not zero, in other words, when the photo-taking lens is not properly focused on an object, the motor rotates to reduce the deviation to zero. Thus, an ordinary servo operation is performed.

Applications of the present invention are not limited to such a servo-control operation. Instead, automatic focus adjustment of an optical system such as a photo-taking lens, etc. or manual focus adjustment following some indication can be produced in various ways, using the output of the sample holding circuit 18a which is a distance signal.

The sample holding circuits 10 and 18 can have their functions reversed with respect to the light projecting state and the non-light-projecting state.

The present invention provides a circuit arrangement in an automatic focusing device which receives an image formed on an object by a projection light source in order to measure a distance to the object by the position of the received image on two spaced light receiving elements. The difference in outputs of the light receiving elements during a light projecting condition and a non-light-projecting condition of the projection light source is detected. This completely eliminates the influence of external light. By detecting the ratio of the output difference, a correct range finding signal can be obtained uninfluenced by the distance to an object and the object's reflection factor. Therefore, the circuit of the present invention makes it possible to obtain a stable and correct range finding result in a comparatively simple manner.

What I claim:

1. An optical deivce, comprising:
   light projecting means for projecting light onto an object whose distance is to be measured;
   light receiving means having a plurality of independent light receiving elements located at separated positions for receiving light projected by said light projecting means and reflected by the object and for producing outputs corresponding to the respective positions of said plurality of light receiving elements;
   ratio detection means for detecting a ratio of the outputs of said light receiving elements, said ratio detecting means including dividing means; for producing a quotient; and
   distance indicating means for indicating a distance to said object on the basis of said ratio of outputs detected by the output ratio detection means.

2. An optical device according to claim 1, in which the distance indicating means includes:
   a shiftable photo-taking lens;
   positional signal producing means for producing a signal corresponding to a position of said photo-taking lens;

focus position indicating means for producing a signal corresponding to an output from said ratio detection means and an output from said positional signal producing means; and a servo-motor for shifting the photo-taking lens to an in-focus position, said servo-motor being responsive to the signal from the focus position indicating means.

3. An optical device according to claim 1 or claim 2, in which the projecting means and the light receiving elements are separated along a base line and at least one of the plurality of light receiving elements is constructed so the light reflected from the object strikes the one of the elements along an area which varies with respect to a direction along the base line.

4. An optical device, comprising:
light projecting means for projecting light onto an object whose distance is to be measured;
light receiving means having a plurality of independent light receiving elements for receiving light projected by said light projecting means and reflected by the object, said light receiving means producing outputs respectively corresponding to the positions of said plurality of light receiving elements;
difference detecting means for detecting differences in outputs of said light receiving means when said light projecting means is projecting light and when not projecting light;
ratio detection means for detecting the ratio of each output in the output difference detection means, said ratio detecting means including dividing means for producing a quotient; and
a distance indicating means for indicating a distance to the object on the basis of said ratio of output detected by said output ratio detecting means.

5. A device according to claim 4, in which the distance indicating means includes:
a shiftable photo-taking lens;
positional signal producing means for producing a signal corresponding to a position of the photo-taking lens;
focus position indicating means for producing a signal responsive to an output of the distance output ratio detection means and an output of the positional signal producing means; and
a servo-motor for shifting said photo-taking lens to an in-focus position; said servo-motor being controlled by a signal from the focus position indicating means.

6. A device according to claim 4 or claim 5, in which the projecting means and the light receiving elements are separated along a base line and at least one of the plurality of light receiving elements is constructed so that light reflected from the object strikes the one of the elements along an area which varies with respect to a direction along the base line.

7. An optical device for measuring a distance of an object by projecting a distance measuring signal on the object and receiving the signal reflected by the object, comprising:
(A) light projecting means for projecting said distance measuring signal;
(B) signal receiving means for receiving said distance measuring signal,
said signal receiving means including a plurality of separate signal receiving elements at least one of which produces an output corresponding to its position for receiving said distance measuring signal;

(C) ratio detecting means for detecting a ratio equivalent to an operation result of dividing the output corresponding to the receiving position by an output of another signal receiving element; and
(D) distance indicating means for indicating the distance of the object in response to the output of the ratio detecting means.

8. An optical device according to claim 7, in which the distance indicating means includes:
a shiftable photo-taking lens;
positional signal producing means for producing a signal corresponding to a position of said photo-taking lens;
focus position indicating means for producing a signal corresponding to an output from said ratio detection means and an output from said positional signal producing means; and
a servo-motor for shifting the photo-taking lens to an in-focus position, said servo-motor being responsive to the signal from the focus position indicating means.

9. An optical device according to claim 7 or 8, in which the signal receiving element producing the output corresponding to the signal receiving position is designed so as to have a signal receiving area variable with respect to a direction of the base line.

10. An optical device for measuring a distance of an object by projecting a distance measuring signal on the object and receiving the signal reflected by the object, comprising:
(A) light projecting means for projecting said distance measuring signal;
(B) signal receiving means for receiving said distance measuring signal,
said signal receiving means including a plurality of separate signal receiving elements at least one of which produces an output corresponding to its position for receiving said distance measuring signal;
(C) difference detecting means for operating differences in outputs of said light receiving elements when said signal projecting means is projecting light and when not projecting light;
(D) ratio detecting means for detecting a ratio equivalent to an operation result of dividing the output of said difference detecting means operated from the output corresponding to the signal receiving position by an output of another output difference detecting means; and
(E) distance including means for indicating the distance of the object in response to the output of the ratio detecting means.

11. A device according to claim 10, in which the distance indicating means includes:
a shiftable photo-taking lens;
positional signal producing means for producing a signal corresponding to a position of the photo-taking lens;
focus position indicating means for producing a signal responsive to an output of the distance output ratio detection means and an output of the positional signal producing means; and
a servo-motor for shifting said photo-taking lens to an in-focus position, said servo-motor being controlled by a signal from the focus position indicating means.

12. An optical device according to claim 10 or 11, in which the signal receiving element producing the output corresponding to the signal receiving position is designed so as to have a signal receiving area variable with respect to a direction of the base line.

* * * * *